United States Patent

Little

[15] 3,693,426

[45] Sept. 26, 1972

[54] PORTABLE USEFUL HORSEPOWER MEASURING INSTRUMENT

[72] Inventor: Donald R. Little, 132 Chestnut Drive, Greensburg, Pa. 15601

[22] Filed: July 2, 1971

[21] Appl. No.: 159,202

[52] U.S. Cl. .....................73/133, 73/117.3, 73/511
[51] Int. Cl. ...............................................G01l 3/24
[58] Field of Search.........73/133, 136 R, 117.3, 511, 73/512, 116

[56] References Cited

UNITED STATES PATENTS

| | | | |
|---|---|---|---|
| 3,094,877 | 6/1963 | Gold | 73/517 R |
| 3,274,826 | 9/1966 | Ingram | 73/136 R |
| 3,299,698 | 1/1967 | Spiess et al. | 73/136 R |

Primary Examiner—Charles A. Ruehl
Attorney—H. A. Williamson

[57] ABSTRACT

A readily portable apparatus and method for determining the useful horsepower of any prime mover, operating on any given roadway grade with a known load. The apparatus includes a velocity signal source having an input of the velocity of rotation delivered by the prime mover and having an output directly proportional to the velocity of rotation of the prime mover. An inertial acceleration signal generator which has a signal output directly proportional to the absolute acceleration parallel to the given roadway. A signal summing and time constant circuit having at least one input being the absolute acceleration signal.

18 Claims, 16 Drawing Figures

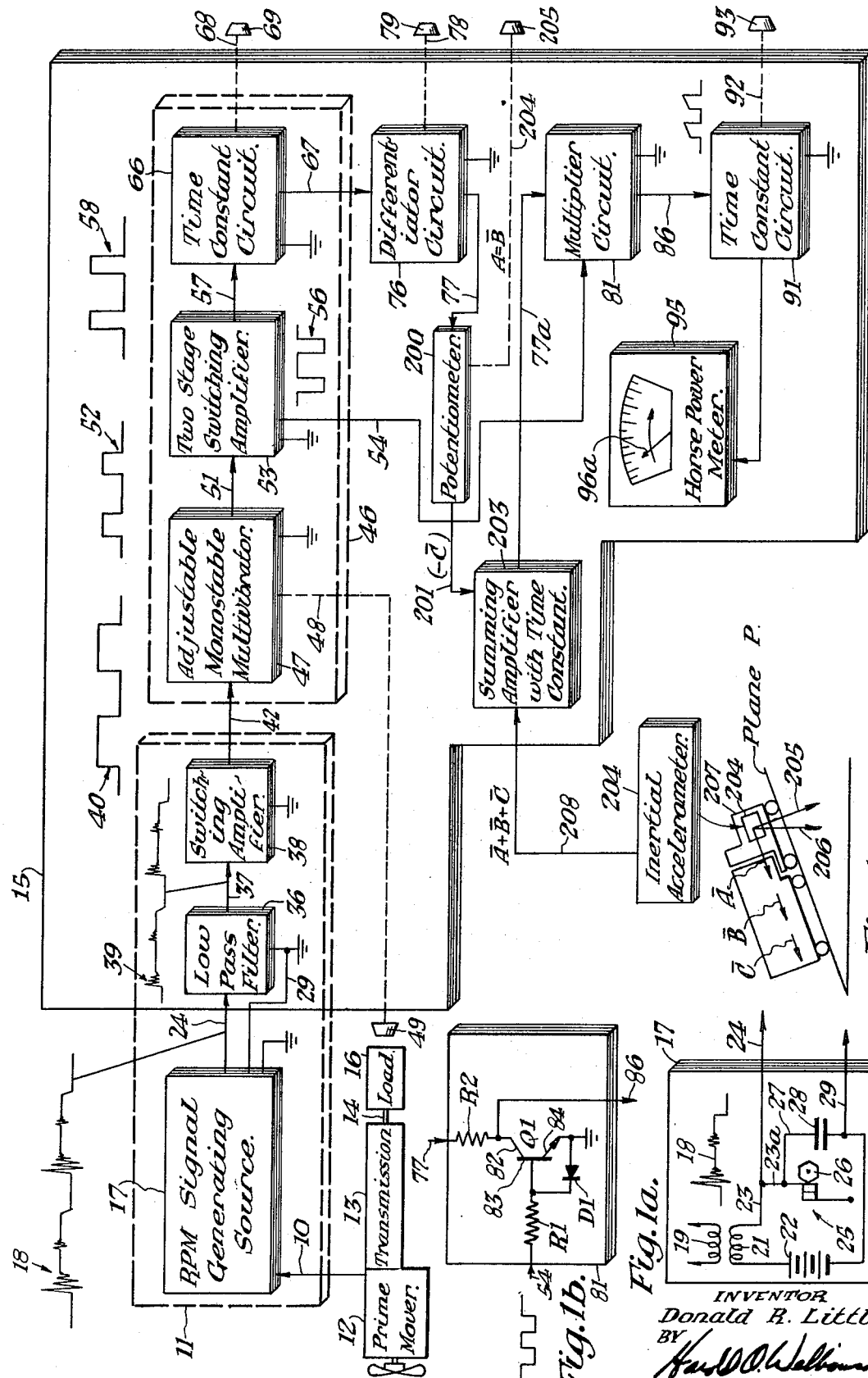

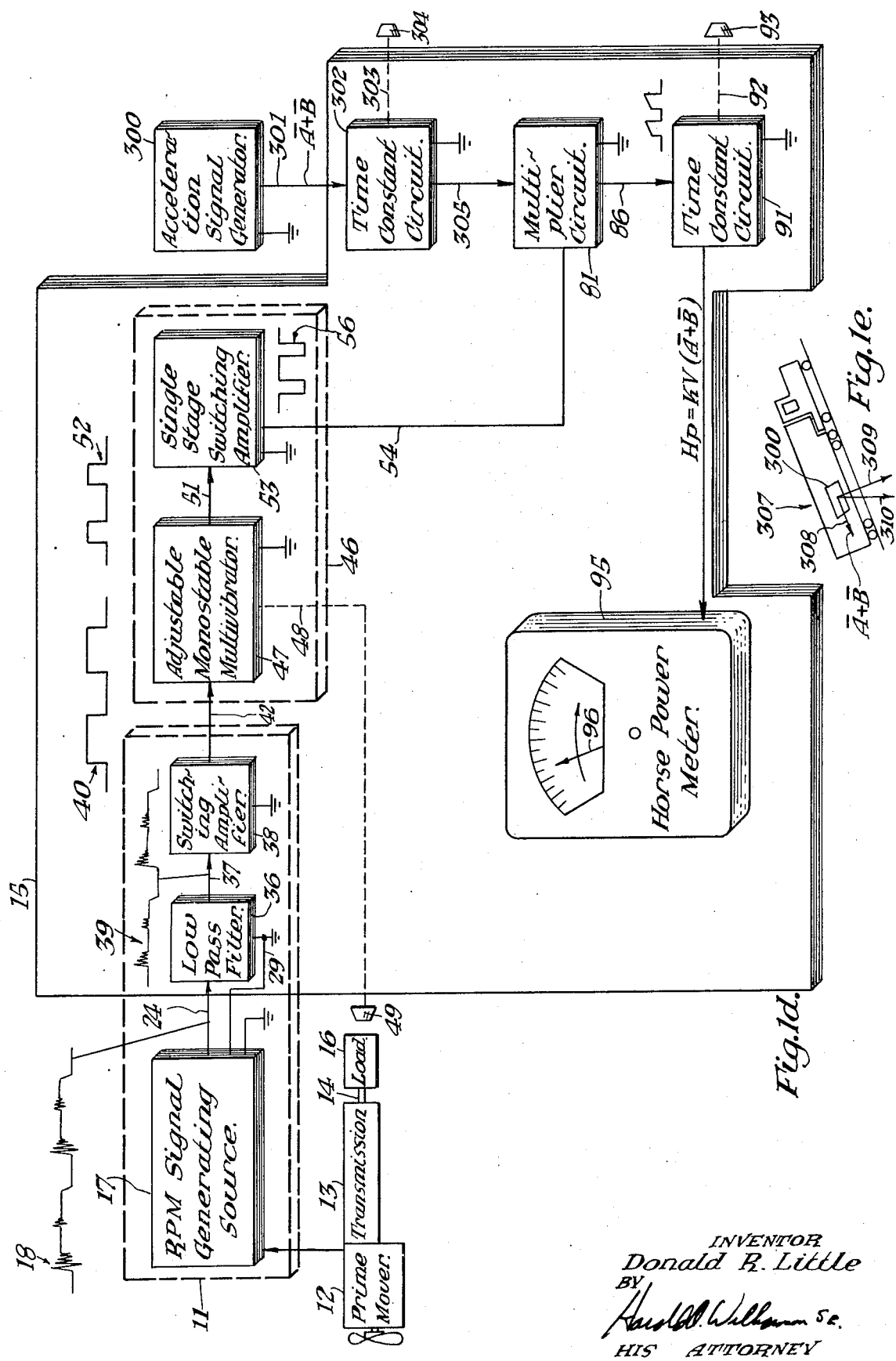

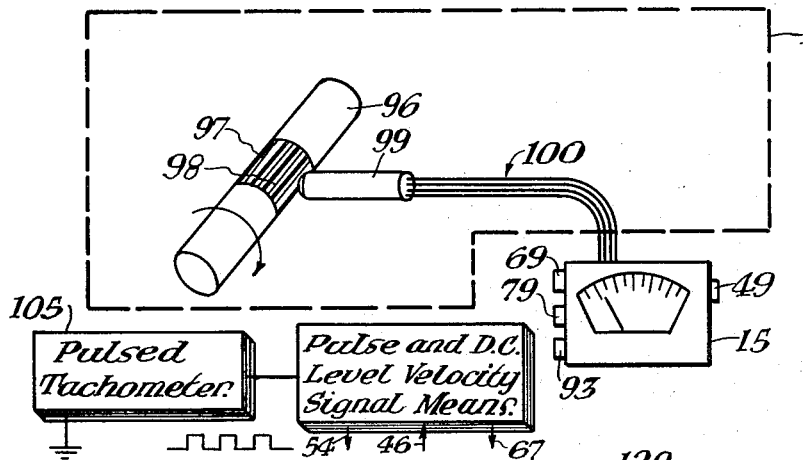
Fig.3.
Fig.4.
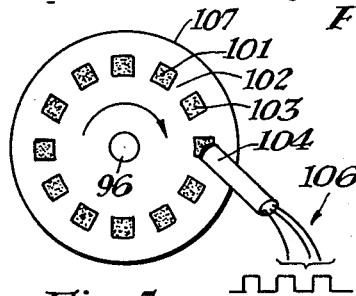
Fig.5.
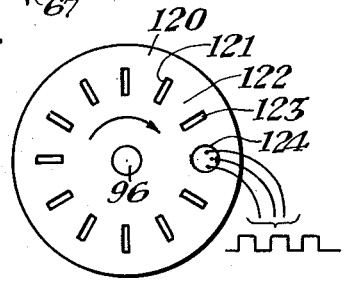
Fig.6.
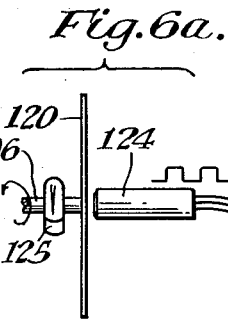
Fig.6a.
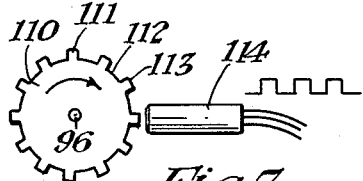
Fig.7.
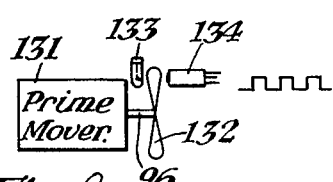
Fig.8.
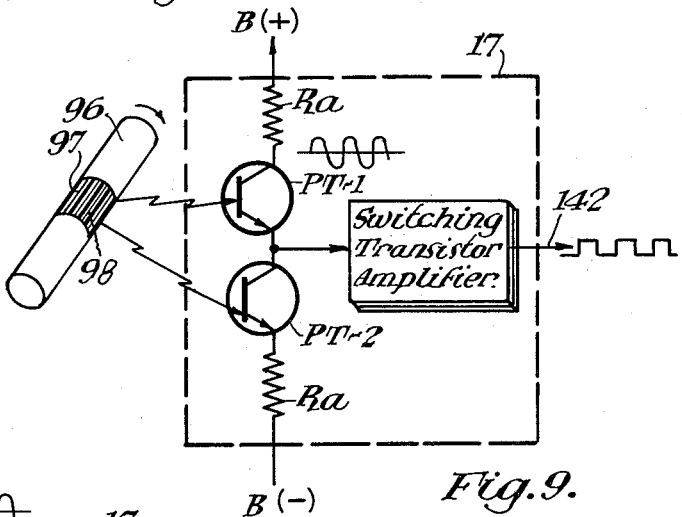
Fig.9.
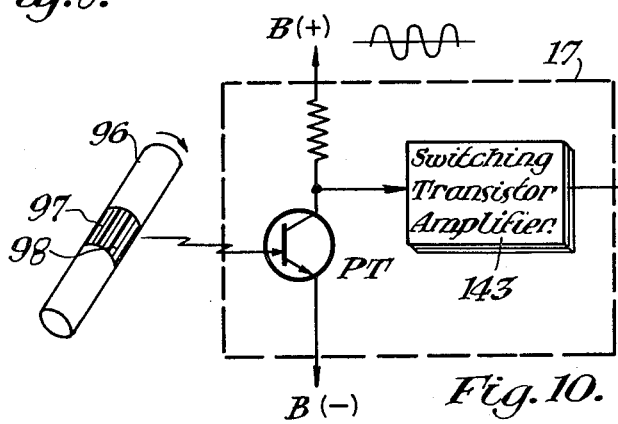
Fig.10.
INVENTOR
Donald R. Little.
BY
Harold B. Williams
HIS ATTORNEY

PORTABLE USEFUL HORSEPOWER MEASURING INSTRUMENT

This invention relates to both an apparatus and method for determining the useful torque and horsepower of any prime mover, operating under a given load on any given roadway grade.

More specifically the apparatus utilized performs the following functional steps of operation. These steps include producing a velocity signal directly proportional to the velocity of rotation of the prime mover from an input signal having a characteristic indicative of the velocity of rotation of the prime mover. The next step the apparatus must perform is to derive an inertial acceleration signal parallel to the given roadway grade. In the final step the apparatus must provide the multiplication of the velocity signal times the absolute acceleration signal, times a constant to render a product signal which is directly proportional to the useful horsepower.

A study of history will how that over the years there have been repeated attempts in the horsepower and torque measuring arts to find a simple and inexpensive way to measure actual output horsepower or torque. To this point there have been many contributions, some highly complex and others less complex, but all of them have required heavy, physically large installations that have been for the most part permanently installed in a maintenance shop or garage. Their complexity and high cost have limited their use to only those individuals who made it their exclusive business to provide such service.

Therefore, trucking fleets that must carry enormous loads cross country or through hilly terrain and are faced with meeting delivery schedules where time is of the essence are faced with a problem. The firms that own these trucking fleets are frequently forced to operate their truck engines until they reach a point of breakdown or such loss of power as to make them uneconomical to continue operation. The instrument of this invention provides the owners of such vehicles the means to record and recognize decrease in performance over a period of operation, thereby affording them valuable insights into potential malfunctions and poor operation economy. Inherently such record keeping will allow them to avoid breakdown and the concomitant economic loss due to the loss of use of one or more vehicles. Furthermore, there has been no convenient way to determine whether there have been any significant changes in horsepower and torque which may be symtomatic of potential failure of some component of the entire drive train. The invention to be described hereafter avoids all of these problems without the need for expensive and bulky equipment to ascertain useful torque and horsepower.

An object of this invention is to provide an easily portable unit coupled to the prime mover and its related components for measuring useful torque and horsepower which may be located in the driver compartment of a vehicle while the vehicle is in motion.

Still another object of this invention is to provide a portable, small in size and weight, economical instrument unit which can readily measure the useful accelerating and decelerating torque and horsepower actually available to proper or stop a vehicle.

Still yet another object of this invention is to provide an instrument unit that will detect the early changes in torque and horsepower to related possible malfunctions and indicate when action should be taken to avert situations ranging from a light inconvenience to a serious and costly malfunction at any point along the power train.

A significant object of this invention resides in the measuring of horsepower by detecting and producing a signal directly proportional to engine rpm or vehicle speed and an acceleration signal directly proportional to an absolute acceleration parallel to the roadway grade which is indicative of useful horsepower and torque.

Yet another object of this invention resides in the measuring of horsepower by detecting and producing a signal directly proportional to engine rpm or vehicle speed and utilizing an accelerometer connected to the vehicle to provide an acceleration signal directly proportional to absolute acceleration parallel to the roadway grade which is indicative of useful horsepower and torque.

A further object of this invention is to show a method of cancelling an error created by the inadvertent measurement of a component of gravity which is caused by the reaction torque resulting from the power applied to the vehicle drive wheels. This causes a "tilt" of the vehicle and results in the inertial accelerometer sensing an additional component of gravity which is not related to the actual torque supplied by the motor.

In the attainment of the foregoing objects the preferred embodiment of the invention, that is, the instrument that determines the useful torque and horsepower of any prime mover, includes a number of basic circuit units.

The first of these units is termed a pulsed velocity signal means having an input indicative of the velocity of rotation delivered by a prime mover and having an output directly proportional to the velocity of rotation of the prime mover. An absolute acceleration signal generator is provided which has a d.c. level signal output directly proportional to the acceleration of any given roadway. A signal summing time constant unit has as one of its inputs the d.c. level signal which is directly proportional to said acceleration signal and has as its output a d.c. signal which is compatible with the rest of the apparatus. A multiplier circuit unit is coupled respectively to both the pulsed velocity signal and the absolute acceleration signal output to thereby provide an output signal which is a multiplication of the pulsed velocity signal output and the gain controlled signal output. In addition, the signal summing time constant circuit has an input which can be used to negate any acceleration error component due to tilt of the vehicle during acceleration of the vehicle which will be discussed later. Finally there is a gain controlled time constant circuit coupled to the multiplier circuit unit output, the output from the time constant circuit being the useful horsepower at any given instant on any given roadway during operation of the prime mover. The useful torque (or force) is obtained when the absolute acceleration signal bypasses the multiplication stage and is applied directly to the gain controlled time constant circuit.

Other objects and advantages of the invention will become apparent from the ensuing description of illustrative embodiments thereof, in the course of which reference is had to the accompanying drawings in which:

FIG. 1 illustrates the preferred embodiment of the invention in block diagram form.

FIG. 1a depicts a portion of a prime mover's ignition system utilized in conjunction with the preferred embodiment of FIG. 1. FIG. 1b illustrates a multiplier circuit used in the embodiment of FIG. 1.

FIG. 1c shows a tractor trailer combination utilizing the invention.

FIG. 1d depicts another system embodying the invention.

FIG. 1e shows a second tractor trailer combination utilizing the invention as shown embodied in FIG. 1d.

FIG. 3 shows one form of photosensitive prime mover rpm detection.

FIG. 4 shows another form of detecting prime mover rpm utilizing a tachometer.

FIG. 5 shows one form of photosensitive prime mover rpm detection.

FIG. 6 shows one form of photosensitive prime mover rpm detection.

Figure 2:
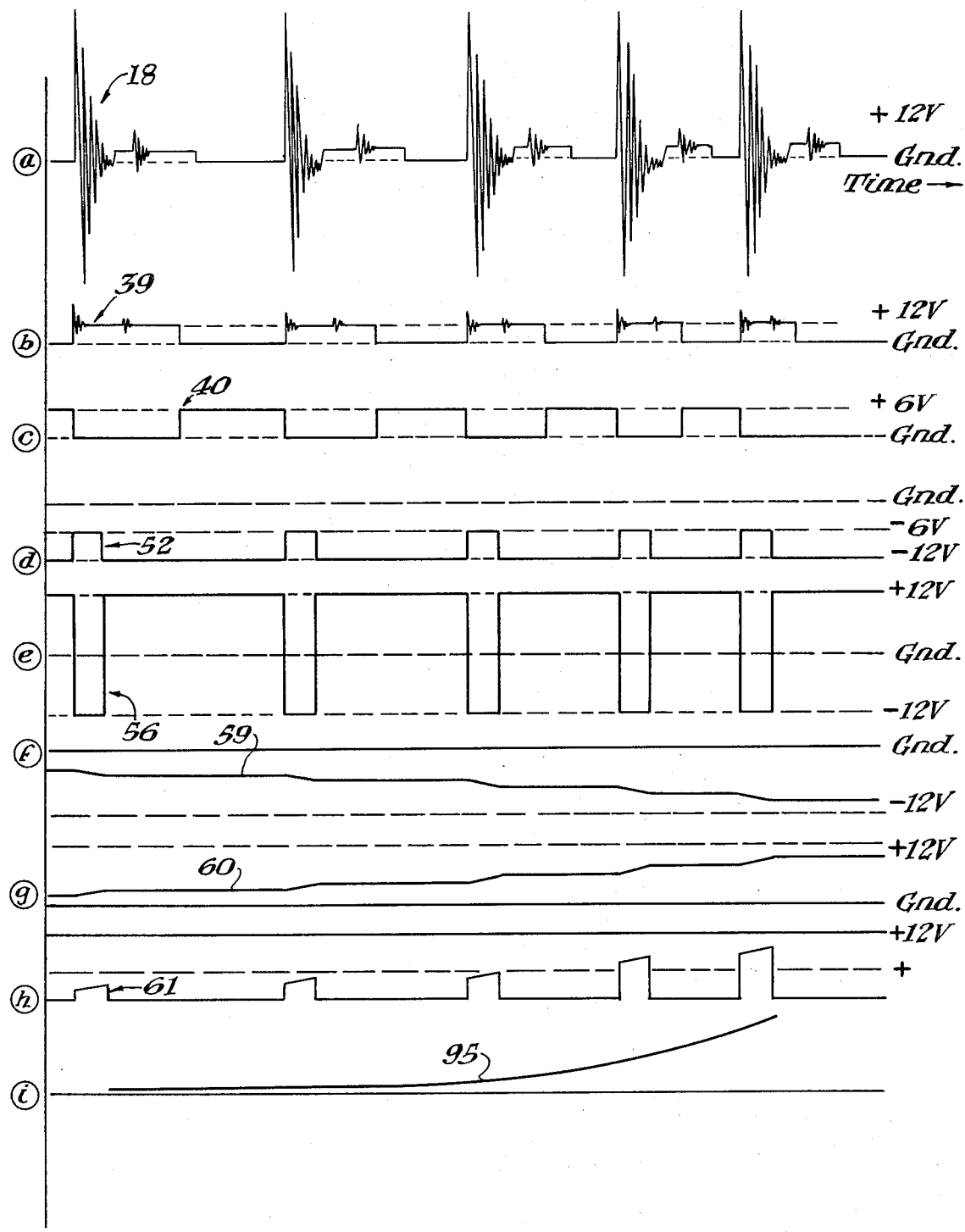
FIG. 2 represents the wave forms that are present at different points in the preferred embodiment of FIG. 1.

FIG. 6a further illustrates the configuration as viewed from the side of FIG. 6.

FIG. 7 shows a magnetic arrangement for detecting primer mover rpm.

FIG. 8 shows one form of photosensitive prime mover rpm detection.

FIG. 9 shows one form of photosensitive prime mover rpm detection.

FIG. 10 shows still another form of photosenstive prime mover rpm detection.

In order to gain a full understanding of the invention it is essential that a study be made of the various parameters that are involved in the determination of useful horsepower or torque.

In the trucking industry most engines are tuned to the manufacturer's specifications irrespective of the age or condition of engine or prime mover, and the condition of the drive train from the engine to the tractive wheels of the truck.

In order to understand the theory behind the implementation and operation of the invention to be described, the following mathematical analysis should be studied.

Starting with basics the following is a well-known expression of horsepower (Hp):

$$Hp = work/time \qquad (a)$$

where work = force $F$ moved through a distance.

One pound force $F$ used to maintain mass in motion through 1 ft. of distance $d$ produces 1 ft-lb of work; also note time is not part of this work equation.

By definition: 550 ft-lb moved per second equal 1 horsepower or stated in equation form:

$$550 \text{ ft-lbs force/sec} = 1 \text{ horsepower} \qquad (b)$$

Velocity $V$ is measured in ft. per sec., ft. per min., ft. per hr., or more commonly the ft. parameter is changed into miles and we have miles per hour (mph).

Therefore, in the above equation (b) we see the following in the left-hand side of the equation:

$$550 \text{ ft-lbs-force/sec}$$

and that 550 is a constant which can be termed $K$ and $K = 550$. Note also ft/sec equals Velocity $V$ and lb-force is $F$. Therefore, equation (b) can be rewritten in general terms as follows:

$$Hp = KVF \qquad (c)$$

where $K$ is a constant of proportionality.

It is therefore desired to obtain instantaneous values of velocity and force and multiply these together with $K$. To obtain the actual horsepower delivered to the rear wheels the force being exerted at the drive wheels is of basic interest. This force $F$ can be expressed by:

$$F = f_1 + f_2 + f_3 + f_4 + f_5$$

where $f_1$ = force due to component of gravity parallel to roadway $f_2$ = force available to accelerate the vehicle (with respect to the plane of the roadway)

$f_3$ = force used to overcome aerodynamic drag $f_4$ = force used to overcome rolling friction $f_5$ = force used in overcoming various resistances (tire heating loss etc.).

The useful torque and horsepower delivered to the drive wheels is associated with the sum of $f_1$ and $f_2$ and since these are the predominant forces (unless there is considerable wind resistance whose drag can be calculated manually or automatically if certain facts are known such as wind velocity, instantaneous vehicle velocity, equivalent flat plate frontal area) and are therefore of prime importance. For the purposes of this discussion the accelerating force $F_a$ will be expressed by:

$$F_a = f_1 + f_2$$

By definition force $F$ equals mass $M$ times acceleration $a$ or in equation form:

$$F = Ma \qquad (d)$$

Mass by definition may be considered as the equivalent of inertia, or the resistance offered by a body to a change in its direction of motion. As is generally known, masses are compared by weighing them, which amounts to comparing the forces of gravitation acting on them. Therefore, mass is generally stated in absolute units.

For the case under consideration acceleration $a$ can be considered as inertial acceleration and therefore is related directly to $F_{(a)}$.

Accordingly, horsepower measured in a dynamic or accelerating mode may be designated as $Hp_{(a)}$ and since the force is also in a dynamic or accelerating mode it may be referred to as $F_{(a)}$ and then equation (c) becomes:

$$Hp_{(a)} = K F_{(a)} V \qquad (e)$$

Also, equation (d) may be rewritten to express this accelerating mode as:

$$F_{(a)} = Ma \qquad (f)$$

Then by substituting equation (f) in equation (e) we have, $$Hp_{(a)} = K(Ma)V \qquad (g)$$

Accordingly, acceleration horsepower $Hp_{(a)}$ can be determined, for example, by determining both acceleration $a$ and velocity $V$ of rotation, revolutions per minute (rpm) of the power source. This velocity measurement may be done in a variety of ways; in the invention to be discussed hereinafter an electrical signal representative of the rpm will be utilized.

It is apparent for any given set of conditions both $k$ and $M$ can be considered constant, i.e., $K_{(a)}$, therefore $$K_{(a)} = KM \qquad (h)$$

therefore, substituting equation (h) in equation (g) we have $$Hp_{(a)} = K_{(a)} a V \qquad (i)$$

Where acceleration $a$ is the absolute acceleration in the plane the vehicle is traveling it therefore includes the effect of the force of gravity and its attendant acceleration. That states that the accelerating horsepower (which can be termed "useful horsepower" since all other horsepower produced by the engine is used up in overcoming forces due to friction and unwanted drag) can be obtained by multiplying velocity and acceleration providing the proper scale factor is used.

It is also an important characteristic of this invention that the accelerating torque (or accelerating force $F_1$ — also called net tractive effort) can also be separately obtained by measuring the inertial acceleration providing the proper scale factor is used (which is a function of the mass or weight of the vehicle).

Up until this point we have been speaking in generalities with reference to $F_{(a)}$, but it should be noted that $F_{(a)}$ is the accelerating tractive force, or in the case of a vehicle it would be referred to as the accelerating torque. When equation (f) is referred to, and the equation is stated in terms of acceleration we have $$a = F_{(a)}/M \qquad (j)$$

Reference is now made to FIG. 1, in which there is illustrated a preferred embodiment of the invention in block diagram form. As is evident from viewing this block diagram figure, a portion of the apparatus is shown extending beyond the main instrument 15. This main instrument 15 is comprised of a number of circuits most of which are common circuits, and as the description follows each of the circuits, which is of a conventional nature, will be identified and incorporated by reference will be a notation as to where each of these circuits may be found in general text material available to the public.

It is apparent that the dashed unit 11, which will be referred to as pulsed signal source 11 hereafter, incorporates a circuit portion outside the basic instrument 15, in that it contains an rpm signal generating source 17. This rpm signal generating source 17 may, in the case of any conventional vehicle, be a portion of the ignition system.

As shown here, there is also included directly beneath the rpm signal generating source 17 in block diagram form, a prime mover 12 which has a transmission 13, a shaft 14 coupling the transmission 13 to a driven load 16, which may be a real load or a simulated load, to be explained more fully hereinafter. In the event that the prime mover is not of the conventional combustion engine type normally found in automobiles and some trucks but is of the diesel type as found in many buses and trucks, then the rpm signal generating source will be a device which cooperates with a moving element of the entire power train represented by prime mover 12, transmission 13, shaft 14, and load 16. What will be critical and be described more fully hereinafter are the techniques by which one may obtain a signal directly proportional to the rpm of the prime mover which, for the purposes to be described, would be directly proportional to the speed of the vehicle.

In order to appreciate the invention described, FIG. 1 and FIG. 2 should be studied at the same time in order that the pulses that appear and d.c. level signals that appear throughout the circuit description will have meaning with reference one to another.

As just noted, FIG. 2 represents the pulse wave forms or the signal wave forms, as the case may be, that appear in a typical automotive ignition system arrangement. The description that now follows will presume that the prime mover 12 and its related rpm signal generating source 17 are that which would be found in a conventional internal combustion engine normally found in any vehicle.

In order to understand the nature of the rpm signal source and those portions of the vehicle's ignition system that are involved, a study of FIG. 1a is essential. There will be seen in FIG. 1a the rpm signal generating source 17 set out in block form which has contained therein a primary coil 21 and a secondary coil 19 which are normally found in the coil of the ignition system of the vehicle. A power supply in the form of a battery 22 is connected directly to the primary coil 21 as can be seen. Also coupled to the primary coil 21 via the lead 23, 23a is a set of breaker points 25 which are conventional in nature. These breaker points 25 are interrupted or opened and closed at a rate directly proportional to the rpm of the vehicle, and their opening and closing is controlled by the distributor cam 26 which rotates at a speed directly proportional to engine velocity, as we have referred to above, at a speed which will be representative of and directly proportional to the speed of the vehicle. As these breaker points 25 are opened and closed, there will be a pulsed output appear of the type shown in wave form 18 in FIG. 1a, as well as FIG. 1, on the lead 23. This wave form 18 is shown as an a.c. signal superimposed upon a pulsed d.c. level signal which is present because of the d.c. battery supply source 22. This a.c. signal is delivered over lead 24 to a low pass filter 36 to remove most of the a.c. component and produces an output signal on lead 37 which is depicted by the wave form 39. Note also that the rpm signal source has a separate lead 29 connected to ground of the low pass filter 36. This indicates that both the rpm signal source 17 and the low pass filter 36 and the other related circuits in this system are all electrically coupled to the same ground.

This low pass filter 36, shown contained within the instrument 15, is a conventional single or multiple stage low pass filter circuit, such as that described in electrical engineering books on network or circuit analysis. See, for example, "Network Analysis and Synthesis" by Kuo, published by Wylie & Sons. The wave form output from the low pass filter is the wave form output shown on line B of FIG. 2, as well as that which is shown in FIG. 1.

The signal wave form 39 passes along the electrical lead 37 to a switching amplifier 38 which is also grounded. The output signal from this switching amplifier is shown by wave form 40 in FIG. 1, as well as the wave form shown on line C of FIG. 2. It can be seen from a study of FIG. 2 that the wave form 40 shown on line C is generated as a consequence of the leading edge of the wave form 39 of line B in FIG. 2 entering switching amplifier 38. This wave form 40, which represents the signal, provides the base signal input for a common emitter switching transistor amplifier stage, shown here as switching amplifier 38. This type of switching transistor amplifier using the common emitter configuration is described in Chapter VI of "G. E. Transistor Manual," copyrighted in 1964, or in Section 22 of "Digital Transistor Circuits," by Harris Gray & Searle, copyrighted in 1966 by Educational Services Inc. and published by Wylie & Sons.

This switching amplifier signal 40 is used to trigger an adjustable monostable multivibrator 47 which produces a fixed time wave pulse as shown by wave form 52 in FIG. 1, and on line D of FIG. 2. It should be noted that the adjustable monostable multivibrator 47 is only one of three basic elements to what will be termed hereafter and shown in dotted outline as a pulsed and d.c. level velocity signal means 26, which includes, besides the adjustable monostable multivibrator 47, a two-stage switching amplifier 53, as well as a time constant circuit 46, both of which will be described more fully hereafter.

It is important to note the d.c. component of this output signal having wave form 40, which appears on lead 42 and is the input to the adjustable monostable multivibrator 47, is directly a function of rpm. For calibration purposes the pulse duration must be adjustable and so the adjustable monostable multivibrator has an adjusting mechanism comprised of a mechanical link 48 and a calibration knob 49 for this purpose. The analog circuits following the pulse circuit portions of the block diagram of FIG. 1 must be properly "scaled," that is to say, the voltage signal must be related to velocity in a linear relationship. This requires adjusting the d.c. content of the d.c. pulsed wave form to compensate for different gear ratios and the number of cylinders in the vehicle. Again, it should be noted that the pulse wave form 52 and its repetition rate which appear on lead 51 of the adjustable monostable multivibrator 47 are directly proportional to the rpm of the prime mover. The pulse repetition rate on lead 51 is directly proportional to the velocity of the vehicle. This modified pulse width wave form 52 is delivered to a two-stage switching amplifier 53, which has a pair of outputs, namely, a first output on lead 54 which is represented by wave form 56, and wave form 58 which appears on the second output 57 of the two-stage switching amplifier 53. Both of these signals are directly related to the rpm or velocity of the vehicle. Both of these wave forms are shown on lines E and F of FIG. 2. The first output on lead 54 is shown delivered to a multiplier circuit 81 whose function will be described more fully hereafter.

It should be kept in mind for further reference that the signal on lead 54 is a pulsed d.c. level signal whose repetition rate is directly proportional to velocity $V$ noted in the equations at the outset of this specification. The two-stage switching amplifier 53 is made up of two cascaded common emitter switching transistor-amplifier stages, each stage being similar to the circuit used in the switching amplifier 52, which was discussed earlier. The wave form 58, which appears on lead 57, is fed to a time constant circuit 66 which extracts a d.c. level signal 59, FIG. 2, from the switching wave form represented by the wave form 58. The actual circuit used for the time constant circuit 66 employs an operational amplifier of a configuration as described by "Simple Lag," on page 46, Section II.15 of Philbrick and Nexus Research, A Teledyne company. Any offset voltage appearing at the amplifier output can be corrected by adjusting knob 69 which is connected through mechanical linkage 68 to the time constant circuit 66. Time constant circuit 66 may also take the form of the circuit configuration tilted "Delay Time Element" on page 47, Section II.18 of the same manual. The output from the time constant circuit 66 is shown by wave form G in FIG. 2, and as can be seen here this signal is an analog signal having a varying d.c. level. This time constant signal represented by the curve 59 is an analog signal which is delivered to a differentiator circuit 76 where this velocity d.c. level signal is differentiated to produce an acceleration signal by the differentiator circuit 76. It should be noted that a time constant circuit (not shown) is also used in conjunction with the differentiator circuit 76 to provide a filtered d.c. output signal.

The differentiated velocity signal produces an analog signal represented by the curve 60 of FIG. 2. It will now be appreciated that this analog acceleration signal will appear on lead 77 and will be delivered to the potentiometer 200.

At this time there must be a study made of FIG. 1c and its relationship with FIG. 1. In FIG. 1c a trailer truck is illustrated in schematic form. Depicted fixed to the cab 207 of the vehicle is a box 204 which will be referred to as acceleration signal generator 204. This acceleration signal generator 204 is in fact a conventional accelerometer of the type described in the text as "Inertial Guidance for Ballastic Missile" by William T. Russel, Space Technology Laboratories, a Division of The Ramo-Wooldridge Corporation, published Oct. 15, 1958. This type of inertial accelerometer is sensitive to all forces which are parallel to its sensitive axis and capable of causing acceleration. These include the earth's gravitational force as well as those which result in acceleration of the vehicle relative to the roadway surface. FIG. 1c indicates the vectorial forces which affect the accelerometer. Vector 206 represents the total gravitational force acting on the accelerometer while $\overline{A}$ and 205 represent the resolution of vector 206 into the respective components parallel to the road surface and perpendicular to the road surface. Accelerometer 204 is sensitive to the force component $\overline{A}$ but since 205 is perpendicular to the sensitive axis it is not affected by this force.

It is important to note that there are a number of forces acting on a vehicle. Therefore, if the vehicle is equipped with an inertial accelerometer 204, the accelerometer will have an output when the vehicle is being accelerated which includes all of these forces. Accordingly, if the vehicle is on a grade, there will be a component due to gravity 206 designated as $\overline{A}$, which is due to gravitational force in the plane P on which the vehicle is operating. A second force $\bar{B}$ is the net force due to the acceleration of the vehicle in the plane P of the vehicle. A third force $\bar{C}$ will be an incremental additional component due to gravity due to the "tilt" of the vehicle resulting from the reaction caused when torque is applied to the drive wheels. This "tilt" can be explained in another way. All drivers of vehicles have experienced this "tilt" whenever they accelerate, because they note the front of the vehicle rises whenever they accelerate. This component $\bar{C}$ therefore must be excluded from any calculation of useful horsepower since it does not reflect actual force supplied by the vehicle but simply is a component of gravity sensed by the accelerometer. The description that follows will explain how this unwanted component may be effectively removed so that it can be shown how to obtain useful horsepower as a function of absolute acceleration forces $\bar{A}$ and $\bar{B}$ times the instantaneous velocity of the vehicle.

It can be shown that for most vehicles if the same torque is applied to the drive wheels the same tilt angle will result within very small error regardless of the grade. This means that if we can determine the angle of tilt under one set of conditions, then it is reasonable to assume that component $\bar{C}$ is adequately defined for all normal grades. Accordingly, $\bar{C}$ under test conditions has been shown to be a linear function of $\bar{B}$ for many cases.

Keeping in mind that for a given acceleration due to $\bar{B}$ the tilt angle $\theta$ of the vehicle remains essentially constant whether on an up or down grade or on level ground a number of equations become applicable.

This means if we can determine $\theta$ under one set of conditions, then it is reasonable that the component $\bar{C}$ is adequately defined for all grades. This means that $$\bar{C} = f(\bar{B}) \qquad (k)$$

using the equation $$\bar{I} = \bar{A} + \bar{B} + \bar{C} \qquad (l)$$

where $\bar{I}$ is equal to the total of the dynamic forces $(\bar{A}+\bar{B})$ plus $\bar{C}$ which is an error due to the tilting of the vehicle which must be overcome.

On level ground it is apparent that $\bar{A} = 0$, so $$\bar{I} = \bar{B} + \bar{C}$$

and by substituting equation (k) it will also be seen that $$\bar{I} - f(\bar{C}) = \bar{A} + \bar{B} \qquad (n)$$

On level ground $\bar{I} = \bar{B} + \bar{C}$ where $\bar{C}$ is the error; therefore the derivative of velocity $V$ is equivalent to $\bar{B}$ and accordingly $\bar{C}$ can be plotted as a function of $\bar{B}$. At this point we may set the potentiometer 200 via mechanical linkage 204a and knob 205a to take into account $\bar{C}$, and once this is done then the vehicle may be tested on any grade because we are ensured that the $\bar{C}$ error has been cancelled out.

It will be recalled that the output from the differentiator 76 is the derivative of velocity $V$ which is equal to $\bar{B}$ and this acceleration signal is delivered to potentiometer 200 via lead 77 from the differentiator 76. When the vehicle is in motion, the inertial accelerometer 204 has an output on lead 208 which is equal to $\bar{A} + \bar{B} + \bar{C}$. As has been noted $\bar{A}$ is equal to zero on a level grade and the potentiometer 200 can be set to remove the error $\bar{C}$. The output on lead 208 is fed to a summing amplifier with a time constant 203 and the output from summing amplifier, which amplifier is the same as time constant circuit 66 described earlier, will appear on lead 77a to multiplier circuit 81. Accordingly, when the basic equations referred to at the outset of this specification are studied, one will see that we have delivered to the multiplier circuit 81 a velocity signal $V$ on lead 54 and we have an acceleration signal $\bar{A}+\bar{B}$ on lead 77a. The multiplier circuit 81 is shown in FIG. 1b where the details of the circuit are set forth. It can be seen that the multiplier circuit 81 has the velocity input on signal lead 54 and the acceleration signal on lead 77. It should be noted with reference to the differentiator 76, which provides the acceleration signal A or B to the potentiometer 200, that this differentiator circuit may be like that which is shown in Section II.19, page 48, and Section II.21, page 49, of Philbrick and Nexus "Application Manual for Operational Amplifiers."

At the heart of the multiplier circuit 81, FIG. 1b, there is a transistor 21 which is turned on, i.e., saturated, while the signal from the two-stage switching amplifier 53, which is indicative of velocity and appears on lead 54, is in the positive state and this transistor is turned "off," therefore becoming blocking, when the signal on lead 54 is negative. When the transistor 21 is turned "on," the collector 82 is at approximately the same potential as the emitter 84 of the transistor Q1. During the interval when the transistor Q1 is turned "off," the collector assumes a d.c. level of the output on lead 77a from the summing amplifier with time constant 203. This produces the output shown in wave form h of FIG. 2 which has a d.c. level which varies as the product of velocity or rpm, and absolute acceleration $\bar{A}+\bar{B}$. In the multiplier circuit 81, resistor R1 acts to limit the transistor base drive current and the diode D1 acts to limit the reverse voltage applied to the base emitter junction 83 - emitter junction 82 of the transistor Q1. The signal represented by the wave form 61, line i of FIG. 2, is that applied over lead 86 to time constant circuit 91 which has an adjustable feature in that it includes mechanical link 92 and adjusting knob 93. This knob 93 is used to properly "scale" the analog horsepower output signal as a function of the mass being driven by the prime mover.

This time constant circuit is similar to the circuit described previously with reference to time constant circuit 66 with the exception that an amplifier is used as a follower as described in Section II.2, page 40 of the Philbrick and Nexus "Application Manual for Operational Amplifiers" except that the gain is made variable by making the feedback resistor a fixed resistance in series with a potentiometer. This potentiometer is mechanically linked, while not shown, to mechanical linkage 92 and adjusting knob 93. The output wave form of the time constant circuit 91 reflects the weight or, as it might otherwise be stated, the mass to be driven and this mass or weight would be equal to the weight of the vehicle with the addition of the passenger or passengers that might be in the vehicle. This time constant circuit 91 is adjusted to reflect this parameter. This parameter has been treated in the earlier equations as constant $K_a$.

We will now see that the output signal 95, FIG. 2, on lead 94 is representative of useful horsepower and torque and all the elements of the basic equation $Hp_{(a)} = K_a V A$, and we now have the output which is shown on line $i$ of FIG. 2 delivered to a conventional meter 95, which measures an analog d.c. voltage. This meter 95 is referred to as a horsepower meter, and as the load 16 is accelerated as the vehicle moves in response to its accelerating mode, there will be seen a movement of the needle 96a in the direction of the arrow shown immediately crossing the needle 96a, and as the vehicle is accelerated the instantaneous useful horsepower available will be reflected by the reading shown on the horsepower meter.

Again, the calibration of this type of meter, as well as the adjustments made to such components as the adjustable monostable multivibrator and both time constant circuit and differentiator circuit, as well as the time constant circuit 92, will all be relative to useful (or accelerating) horsepower.

A most significant aspect of this invention is that the individual who is desirous of determining his maximum horsepower need only ascertain the maximum excursion of the needle 96a to determine maximum horsepower. When the vehicle, in which this instrument is carried, is taken out into a test roadway, one is really concerned with the change in horsepower as distinguished from an absolute reading of horsepower, although it should be recognized that the precision calibration of all of the adjustable circuits depicted will produce a reading that is directly indicative of the numerical value of horsepower. But of more consequence, as just noted, the driver is looking for the maximum horsepower available and this is relative to the existing horsepower being developed. This instrument provides a graphic illustration of the potential increase in horsepower when the engine is finely tuned to obtain maximum useful horsepower.

Reference is now made to FIG. 1d which illustrates an embodiment of the invention where an accelerometer 300 or acceleration signal generator, as it may be termed, is used to detect absolute acceleration. FIG. 1e shows in schematic form that the accelerometer 300 is carried by the dead load or trailer as is shown in this case. It is to be noted that, while only accelerometer 300 is shown in FIG. 1e, this accelerometer is electrically connected to the main instrument 15 by a lead not shown in this figure. It should also be noted that the main instrument 15 is housed in the cab of the vehicle and is also not shown in this figure. For ease of explanation the accelerometer 300 is shown in FIG. 1d in the upper right-hand corner. In addition all components in FIG. 1d are the same as shown and described in FIG. 1, with one exception; instead of a double-stage switching amplifier 53 of FIG. 1 we need only a single-stage amplifier 53' because in this embodiment we have a separate source of determining absolute acceleration, namely, accelerometer 300 which is of the same type described in FIG. 1 as inertial accelerometer 204.

Specific reference is made to FIG. 1e where the force vectors 309 and 310 represent the same force vectors as 205 and 206 in FIG. 1c. Vector 308 is comparable to vector $\overline{A}$, as shown in FIG. 1c. Since there is no "tilt" on the dead load trailer 307, no correction has to be made for an acceleration force vector $\overline{C}$. Time constant circuit 302 is the same as the time constant circuit 66 in FIG. 1 and is similarly adjustable through mechanical linkage 303 and knob 304.

In operation a signal $\overline{A}+\overline{B}$ is generated in acceleration signal generator 300 and transmitted over lead 301 to time constant circuit 302, thence over lead 305 to multiplier 81 where it is multiplied with velocity signal 56 on lead 54 to produce a product which is in turn fed over lead 86 to time constant circuit 91 and a horsepower signal [$Hp=K V(\overline{A}+\overline{B})$] appears on lead 94 to horsepower meter 95.

Reference is now made to FIG. 3 in which there is shown in dotted outline the rpm signal generator 17 which was shown in FIG. 1. This rpm signal generator may take many forms, as will be seen in the figures that will be described hereinafter. In this first embodiment of the rpm signal generator there is incorporated a rotating shaft 96. This rotating shaft 96 is shown not located at any specific point with reference to the prime mover, the transmission, or the final driven component. It is to be understood that any rotating shaft or rotating member, which rotates at a rate directly proportional to the rotational speed of the engine, will produce an output directly proportional to the velocity of the vehicle where a geared transmission is involved. This unique arrangement shown in FIG. 3 has its most significant use when one is trying to determine the engine rpm in the situation where a diesel engine or other prime mover is involved in which an ignition system is not available to produce pulses which are directly proportional in a repetitive rate to the rotational speed of the engine. Accordingly, it is seen in FIG. 3 that the shaft 96 contains a number of striped regions 97 and 98 which are retroreflective in nature and need but, in most instances, the ambient light to produce reflected light which is present as each one of the retroreflective striped regions 97 and 98, for example, passes photosensitive optical pickup 99. It should also be noted that a specific source of light (not shown) may be directed at the rotating retroreflective striped regions to provide the reflected light. The optical pickup 99 is connected via lead 100 to the portable instrument 15 which embodies the invention. It will be noted that the instrument contains the adjusting knobs 49 and 93 as depicted in FIG. 1. There will be produced from the optical pickup 99 a square wave pulsed output which may be utilized to provide the square wave pulse necessary for the adjustable monostable multivibrator 47, which is shown in FIG. 1.

A second embodiment which may be used to determine the rpm and may be substituted for the rpm signal source 17 may, for example, be that which is shown in FIG. 4, which illustrates a pulse tachometer 105 having an output with a wave form depicted beneath the pulse tachometer. This wave form is delivered to the monostable multivibrator 47. These outputs are the same as those which appear in FIG. 1.

Another form of the pickup may take the form of a rotating disc 107 secured to a rotating shaft element 96 of the type referred to with reference to FIG. 3. This disc 107 has a number of reflective regions 101, 103 which are separated by nonreflecting regions such as 102. An optical pickup 104 receives reflected ambient light or light from an internal source and produces an output signal shown to the right of FIG. 5 which is a pulsed d.c. wave form which may be utilized in the determination of the velocity of rotation of the engine.

Another embodiment of the rpm signal source is that shown in FIG. 6 and FIG. 6a wherein there is shown a disc 120 with transparent slots 121 and 123 interspersed with non-transparent regions such as 122. The slotted disc 120 is also mounted on a shaft 96 of the type described with reference to FIG. 1. The optical pickup is similar to those referred to in FIGS. 3 and 5 and is best shown in FIG. 6a where there is illustrated a light source 125 with the rotating disc 120 mounted on a rotating shaft 96. There is also illustrated an optical pickup 124 which produces the pulsed square wave output needed for operation of the circuit as described with reference to FIG. 1.

Another alternative embodiment of the pickup may take the form of a toothed disc 110, as shown in FIG. 8, which is mounted upon rotating shaft 96, referred to hereinabove. This toothed disc has permanent magnetic teeth such as 111 and 113, with regions such as 112 where there is no permanent magnetic field present. There is also provided a magnetic pickup 114 which is conventional in nature and merely detects the passage of each of the permanent magnets, such as 111 and 113, of the toothed disc 110. This magnetic pickup produces a square wave pulse output of the nature shown in FIG. 7.

Reference is now made to FIG. 8 in which one of the most advantageous forms of the invention with reference to the detection of prime mover rotation is shown. Here a prime mover 131 has a conventional shaft 96 which supports and drives a cooling fan 132. Working in cooperation with the cooling fan 132 is a light source 133 and an optical pickup 134. The passage of the blades between the light source 133 and the optical pickup 134 produces a series of repetitive pulsed signal outputs which are directly proportional to engine rpm and, as noted, where a geared vehicle is involved these pulsed outputs will be indicative of the velocity of the vehicle.

Two additional embodiments utilizing phototransistors are shown in FIG. 9 and FIG. 10. Both of these embodiments utilize the rotating shaft 96 described earlier which contains retroreflective stripes 97 and 98 which cooperate with conventional phototransistor circuits in FIG. 9 shown as PT1 and PT2 to provide a sinusoidal signal which is illustrated above the lead from the emitter of phototransistor circuit PT1 and the collector of phototransistor circuit PT2 to the switching transistor amplifier 141. This switching transistor amplifier 141 is conventional in nature and produces a pulsed square wave output on lead 142.

It will be noted that in FIG. 10, the pulsed signal source 17 can also utilize but a single photosensitive transistor PT in a conventional amplifying circuit which recognizes the passage of the rotating retroreflective stripes 97 and 98 on rotating shaft 96. This phototransistor also produces a sinusoidal signal on a lead entering the switching transistor amplifier 143 and there is an output on lead 144 which is a pulsed square wave output indicative of the repetition rate of the passage of the retroreflective stripes 97 and 98.

No mention has been made to this point of those types of vehicles which have automatic transmissions. In regard to these types of devices, it is well recognized that, as each of these transmissions moves or transmits power over a velocity range, there is a shifting of gears within the transmission which is usually determined by a governor arrangement which causes the transition from one torque converter to another as the velocity of the vehicle increases. It should also be appreciated that there are losses incurred within the fluid coupling between a prime mover and the transmission and no direct relationship exists between motor rpm and vehicle speed. To measure vehicle speed (which is necessary in obtaining useful or accelerating horsepower) the speed sensor must be with respect to a wheel or some member on the drive train between the automatic transmission and the drive wheels. Therefore, the outputs which are shown on the horsepower meter 95a should be treated as absolute values and compared one with the other as final adjustments are made on the engine during the testing operation. Therefore, all tuning will be done to reach peak horsepower in any of the given driving ranges of the automatic transmission, and when this is accomplished one will have a prime mover which has been tuned to its maximum capacity to produce the maximum useful horsepower to the tractive wheels of the vehicle in accordance with this invention.

It will also be apparent that other modifications and changes can be made to the presently described invention and, therefore, it is understood that all changes, equivalents, and modifications falling within the spirit and scope of the present invention are herein meant to be included in the appended claims. Such changes contemplate that the entire system be mechanical in nature with related components being the full mechanical equivalent. The same holds true with reference to both hydraulic or pneumatic systems or combinations of all the above-noted arrangements.

Having thus described my invention, what I claim is:

1. A method for determining the useful torque and horsepower of any prime mover, pulling a given load on any given roadway grade,
   a. producing a velocity signal directly proportional to the velocity of rotation of said prime mover from an input signal having a characteristic indicative of said velocity of rotation of said prime mover,
   b. deriving an absolute acceleration signal parallel to said given roadway grade,
   c. multiplying said velocity signal times said absolute acceleration signal, times a constant to render a product signal which is directly proportional to said useful horsepower.

2. A readily portable apparatus for determining the useful horsepower of any prime mover at any point along its power train inclusive of the final drive element in the power train as said prime mover operates with a known load on any given roadway grade,
   a. a velocity signal means having an input indicative of the velocity of rotation delivered by said prime mover and having an output directly proportional to said velocity of rotation of said prime mover,
   b. an absolute acceleration signal generator having a signal output directly proportional to the absolute acceleration parallel to said given roadway, c. a time constant means having as its input said absolute acceleration signal and as its output a gain controlled d.c. signal compatible with the rest of the apparatus, d. a multiplier circuit means coupled respectively to both said pulsed velocity signal output and said gain controlled output to thereby provide an output signal which is a multiplication of said pulsed velocity signal output and said gain controlled signal output, e. a time constant circuit coupled to said multiplier circuit means output, the output from said time constant circuit being said useful horsepower and torque at any given instant on any given grade during operation of said prime mover.

3. The apparatus claimed in claim 2 wherein said absolute acceleration signal generator is an accelerometer.

4. The apparatus claimed in claim 2 wherein said absolute acceleration signal generator is a single degree of freedom accelerometer.

5. The apparatus of claim 2 wherein said prime mover is providing the pulling effort necessary to move a predetermined load.

6. The apparatus of claim 5 wherein said prime mover is housed in the passenger compartment of a vehicle and said predetermined load is the mass of the vehicle being pulled by said prime mover effort.

7. The apparatus of claim 6 wherein said absolute acceleration signal generator is an accelerometer connected directly to said vehicle to determine absolute acceleration parallel to said given roadway.

8. A readily portable apparatus for determining the useful torque and horsepower pulling a given load on any given roadway grade, a. a pulsed signal source having an output indicative of the velocity of rotation delivered by said prime mover at any point along said power train, b. a pulsed velocity signal means coupled to said pulsed signal source output indicative of the velocity of rotation delivered by said prime mover and having an output directly proportional to said velocity of rotation of said prime mover, c. an absolute acceleration signal generator having a d.c. level signal output directly proportional to the absolute acceleration parallel to said given roadway, d. a signal summing and time constant means having at least one input as its absolute acceleration signal and as its output a gain controlled d.c. signal compatible with the rest of the system.

e. a multiplier circuit means coupled respectively to both said pulsed velocity signal output and said gain controlled d.c. signal output to thereby provide an output signal which is a multiplication of said pulsed velocity signal output and said gain controlled signal output, f. a time constant circuit coupled to said multiplier circuit means output, said time constant circuit having a time constant parameter, said parameter is proportional to the mass driven by said prime mover, said time constant circuit means thereby having an output which is directly proportional to the useful horsepower or torque developed at any given instant during operation of said prime mover.

9. The apparatus claimed in claim 8 wherein said absolute acceleration signal generator is an accelerometer.

10. The apparatus claimed in claim 8 wherein said absolute acceleration signal generator is a single degree of freedom accelerometer.

11. The apparatus of claim 8 wherein said prime mover is providing the pulling effort necessary to move a vehicle.

12. The apparatus of claim 11 wherein said absolute acceleration signal generator is an accelerometer connected directly to said vehicle to determine absolute acceleration parallel to said given roadway.

13. The apparatus claimed in claim 8, wherein said pulsed signal source includes in combination an internal combustion engine which has an rpm signal generating source means having a primary coil which has an output electrically coupled to breaker points, said breaker points controlling said output from said primary coil to provide a pulsed output which is directly proportional to the revolutions per minute at which said internal combustion engine is operating, said pulsed output having an a.c. portion which is superimposed on the d.c. level at which said engine ignition d.c. power supply is operating, a. a low pass filter means electrically coupled to said pulsed output which substantially recovers a d.c. wave form while rejecting the a.c. component of said pulsed output and thereby producing a low pass filter output, b. a switching amplifier means electrically connected to said low pass filter output to thereby extract the d.c. level from the switching wave form to thereby produce a pulsed signal output that has a repetition rate equal to the velocity of rotation of said internal combustion engine.

14. The apparatus claimed in claim 8, wherein said pulsed and d.c. level velocity signal means includes an adjustable monostable multivibrator electrically coupled to said pulsed signal output and having a square wave output with a repetition rate directly proportional to the velocity of rotation of said engine, a. a two-stage switching amplifier electrically coupled to said square wave output and having a primary output which is a pulsed output directly proportional to said velocity and a secondary output which is said second output of said pulsed and d.c. level velocity signal means, b. a time constant circuit electrically coupled to said primary output and having an output which is said first output of said d.c. level velocity signal means.

15. The apparatus claimed in claim 8, wherein said pulsed signal source includes an rpm signal generating source means which is a pulsed tachometer.

16. The apparatus claimed in claim 8, wherein said pulsed signal source includes an rpm signal generating source means which includes a rotating element driven at a speed directly proportional to engine rpm, said rotating element having regions thereon spaced such that a detecting means in a region near said rotating means will detect the passing of said regions and produce said pulsed signal.

17. The apparatus of claim 16, wherein said rotating element is a shaft having regions that are of retroreflective material and produce detecting means is a photosensitive optical pickup to produce said pulsed signal.

18. The apparatus of claim 17, wherein said rotating element is a disc with a plurality of peripheral reflective and nonreflective regions and said detecting means is a photosensitive optical pickup to produce said pulsed signal.

* * * * *